United States Patent
Fortin et al.

(10) Patent No.: US 10,018,785 B2
(45) Date of Patent: Jul. 10, 2018

(54) OPTICAL FIBER MODAL DISTRIBUTION CONDITIONER

(71) Applicant: EXFO Inc., Quebec (CA)

(72) Inventors: Remi Fortin, Saint-Jean-Chrysostome (CA); Gang He, Quebec (CA)

(73) Assignee: EXFO Inc., Quebec (CA)

(*) Notice: Subject to any disclaimer, the term of this patent is extended or adjusted under 35 U.S.C. 154(b) by 157 days.

(21) Appl. No.: 14/301,646

(22) Filed: Jun. 11, 2014

(65) Prior Publication Data

US 2016/0202418 A1    Jul. 14, 2016

Related U.S. Application Data

(60) Provisional application No. 61/834,910, filed on Jun. 14, 2013.

(51) Int. Cl.
   *G02B 6/00*      (2006.01)
   *G02B 6/26*      (2006.01)
   (Continued)

(52) U.S. Cl.
   CPC .......... *G02B 6/268* (2013.01); *G02B 6/0281* (2013.01); *G02B 6/0288* (2013.01); *G02B 6/14* (2013.01)

(58) Field of Classification Search
   CPC .............................. G02B 6/268; G02B 6/0288
   (Continued)

(56) References Cited

U.S. PATENT DOCUMENTS

| 4,257,707 A | 3/1981 | Liertz et al. |
| 4,723,827 A * | 2/1988 | Shaw .................. G02B 6/2826 385/16 |

(Continued)

FOREIGN PATENT DOCUMENTS

| EP | 0353690 A2 | 2/1990 |
| EP | 0442731 A2 | 8/1991 |
| GB | 2405488 B | 6/2005 |

OTHER PUBLICATIONS

C. Hamel "Bidirectional OTDR Testing: Multimode vs. Singlemode Fibers", Application Note 043, published in Canada by EXFO Electro-Optical Engineering Inc., 3 pages (Nov. 2006).

(Continued)

*Primary Examiner* — Ellen Kim
(74) *Attorney, Agent, or Firm* — Helene Chotard

(57) ABSTRACT

There is provided a modal distribution conditioner comprising the combination of a mandrel-wrapped optical fiber and an adjustable and fixable loop of optical fiber. It is noted that light entering the modal distribution conditioner is to be generally overfilled compared with the target encircled flux function (as defined by the Standard). The mandrel wrapping introduces macrobends to the optical fiber, inducing modal pre-filtering that roughly transforms the initially overfilled modal distribution to be close to compliance with the appropriate Standard. However, the modal distribution of light having traversed the fixed mandrel typically remains somewhat overfilled. The adjustable loop provides for the fine-tuning of the modal distribution, in conformity with the Standard. Once the requirements defined by the Standard are met, the adjustable loop may be secured in place such that modal distribution becomes fixed and remain stable.

20 Claims, 12 Drawing Sheets

(51) Int. Cl.
  *G02B 6/028* (2006.01)
  *G02B 6/14* (2006.01)

(58) Field of Classification Search
  USPC .................................. 385/133–137, 140, 147
  See application file for complete search history.

(56) References Cited

U.S. PATENT DOCUMENTS

| | | | |
|---|---|---|---|
| 4,877,305 A | 10/1989 | Ricciardelli | |
| 4,934,787 A * | 6/1990 | Ichimura | G02B 6/14 385/123 |
| 5,115,480 A * | 5/1992 | Large | G02B 6/274 385/11 |
| 5,408,545 A * | 4/1995 | Lee | G01M 11/337 359/494.01 |
| 5,684,912 A * | 11/1997 | Slaney | G02B 6/266 385/140 |
| 6,466,728 B1 * | 10/2002 | Radloff | G02B 6/266 385/134 |
| 7,139,457 B2 * | 11/2006 | Guan | H04B 10/2581 385/123 |
| 7,382,962 B1 * | 6/2008 | Yao | G01M 11/088 385/13 |
| 7,720,331 B2 | 5/2010 | Rennie et al. | |
| 9,036,137 B2 * | 5/2015 | Goldstein | G01M 11/088 356/73.1 |
| 9,075,215 B2 * | 7/2015 | Hurley | G02B 6/4432 |
| 2009/0052851 A1 * | 2/2009 | Donlagic | G02B 6/03627 385/124 |
| 2010/0290738 A1 * | 11/2010 | Yan | G02B 6/14 385/28 |
| 2011/0096563 A1 | 4/2011 | Levin et al. | |
| 2013/0293874 A1 | 11/2013 | Goldstein et al. | |

OTHER PUBLICATIONS

A. G. Hallam, "Mode Control in Multimode Optical Fiber and its Applications", PhD Thesis published in the United Kingdom by Aston University, Chapters 5-8, 88 pages (Nov. 2007).

Unknown Authors, "Optical Power Loss Measurements of Installed Multimode Fiber Cable Plant, IEC 61280-4-1 edition 2, Fiber-Optic Communications Subsystem Test Procedure—Part 4-1: Installed cable plant—Multimode attenuation measurement", TIA-526-14B, published in USA by Telecommunications Industry Association, 70 pages (Oct. 2010).

Unknown Author, "Multimode Fiber Characterization—Encircled Flux & Launch Condition Considerations", Application Note, published by JDS Uniphase Corporation, 8 pages (Apr. 2012).

Unknown Author, "The FDA Reference For Fiber Optics—Encircled Flux for Multimode Fiber Measurements", published by the Fiber Optic Association, downloaded Mar. 25, 2013, 9 pages. http://www.thefoa.org/tech/ref/testing/test/EF.html.

Unknown Authors, "Fiber-Optic Communications Subsystem Test Procedure—Part 4-1: Installed cable plant—Multimode attenuation measurement", IEC-61280-4-1 Ed. 2.0, published by the International Electrotechnical Commssion, 60 pages (Mar. 13, 2009).

* cited by examiner

OPTICAL FIBER MODAL DISTRIBUTION CONDITIONER

CROSS-REFERENCE TO RELATED APPLICATIONS

This application claims priority under 35 USC § 119(e) of U.S. provisional patent application(s) 61/834,910 filed Jun. 14, 2013; the specification of which is hereby incorporated by reference.

TECHNICAL FIELD

The invention relates to the propagation of light in multimode optical fibers, and more specifically to the adjustment of the modal distribution of light in multimode optical fibers.

BACKGROUND OF THE ART

Attenuation experienced by light propagating along a data-carrying link comprised of multimode optical fiber is dependent upon the number of "excited" spatial modes and the distribution of the optical power among these modes. More specifically, the outer (usually "higher-order") modes are more subject to attenuation. Accordingly, if too much power is distributed in the outer modes when launching light in a multimode optical fiber, there may be excessive attenuation when light propagates along the optical fiber link.

Encircled Flux (EF) is a function (EF(r)) defined by international Standards, which characterizes the modal distribution of light in multimode optical fibers. It characterizes the near-field power distribution profile of light exiting (into air) a launch cable. It is defined as that proportion of the total exiting optical power which falls within a circle (i.e. "encircled") of radius r at the end face of the fiber, where r is the radial distance from the optical center of the fiber core.

When performing insertion loss and attenuation measurements in a multimode optical fiber, the launch conditions of the test light must be carefully controlled in order to measure reproducible values of insertion loss or attenuation. If the test launch conditions are not well controlled, "differential mode attenuation" may lead to unrepeatable and irreproducible measurement results. If the launch condition of the test light is such that too many modes are excited (the modal distribution is then said to be "overfilled"), some modes, especially the outer modes, are more subject to attenuation. Conversely, if the modal distribution is "underfilled", i.e. too few modes are excited, the attenuation is lower.

In order to address this issue, test and measurement international Standards such as the Telecommunication Industry Association (TIA-526-14-B) and the International Electrotechnical Commission (IEC 61280-4-1) define requirements on the modal distribution of test light for performing measurements on multimode optical fibers. For example, the IEC 61280-4-1 Standard provides for a target for the encircled flux function, EF(r) (see FIG. 1) characterizing the launch conditions and defines very tight tolerances on deviations from that target. More specifically, this Standard defines requirements based on lower and upper boundaries of EF values at four or five predefined radial values in the fiber core and for each of two wavelengths, i.e. 850 and 1300 nm.

When light is coupled to a multimode launch optical fiber, depending on the coupling conditions and on the optical power density of the light source, the coupling may result in the multimode launch optical fiber being "underfilled" (too few modes are excited) or "overfilled" (i.e. too many modes are excited). Means are required to adjust the launch conditions to comply with the EF requirements defined by the Standards.

A known method for controlling launch conditions is mandrel wrapping. Mandrel wrapping, i.e. the tight winding of the multimode fiber about a circular mandrel of a given diameter, results in a preferential attenuation of the high-order modes corresponding to an initially overfilled condition. Although the EF requirements as defined by Standards may be met using this technique, it has the drawback of being dependent upon the exact fiber parameters (i.e. the core diameter and the numerical aperture) of the multimode fiber used. The geometric tolerances provided by multimode-fiber manufacturers are typically not very restrictive and the core diameter of the actual launch-cable fiber therefore varies from one fiber spool to another, and often even within the same spool, within tolerances provided by the optical-fiber manufacturer. When a mandrel of predetermined diameter is employed to adjust the launch conditions within the very strict EF requirements, the only available free adjustment parameter is the number of turns about the mandrel. Unfortunately, different fractions of a turn are typically required on the last turn, resulting in a variability of the orientation of the fiber at the input or output of the mandrel. For that reason, this approach is particularly problematic in manufacturing conditions, where one may wish to subsequently encapsulate the launch conditioner in an optical module or incorporate it within a more complex instrument. This variability in the orientation of the fiber results in fiber management issues.

There is therefore a need for a modal distribution conditioner that addresses at least some of the above concerns.

SUMMARY

There is provided a modal distribution conditioner that may be used within multimode optical fiber test instruments or as a multimode launch cable or device to be used in combination with such a test instrument, in order to adjust launch conditions of test light in the fiber under test in such a way that the modal distribution of the test light conforms with requirements defined by an appropriate Standard (e.g. IEC 61280-4-1), even if parameters of the optical fiber (i.e. the optical core diameter and the numerical aperture) of the constituent multimode fiber are subject to variations within manufacturers tolerances.

In accordance with one embodiment, the proposed modal distribution conditioner comprises the combination of a mandrel-wrapped optical fiber and an adjustable and fixable loop of optical fiber. It is noted that light entering the modal distribution conditioner is to be generally overfilled compared with the target encircled flux function (as defined by the Standard). The mandrel wrapping introduces macrobends to the optical fiber, inducing modal pre-filtering that roughly transforms the initially overfilled modal distribution to be close to compliance with the appropriate Standard. However, the modal distribution of light having traversed the fixed mandrel typically remains somewhat overfilled (or at least not underfilled). The adjustable loop provides for the fine-tuning of the modal distribution, in conformity with the Standard. Once the requirements defined by the Standard are met, the adjustable loop may be secured in place such that modal distribution becomes fixed and remain stable.

In accordance with one aspect of the invention, there is provided an apparatus for adjusting the modal distribution of light propagating in a multimode optical fiber. The apparatus comprises a first portion of multimode optical fiber wrapped about a circular mandrel having a diameter adapted for inducing preferential attenuation of high-order optical fiber modes of said light in said first portion of multimode optical fiber; and an adjustable loop of a second portion of multimode optical fiber optically coupled to said first portion, for adjusting the modal distribution of said light.

In accordance with a further aspect, the mandrel may comprise a fiber positioning feature for receiving one end of the adjustable loop of optical fiber and determining an orientation of the optical fiber at this one end, the loop being adjustable by sliding this one end within the positioning feature.

In this case, the positioning feature on the mandrel maintains a fixed orientation of the optical fiber at the output of the apparatus, thereby solving above-mentioned optical fiber management issues.

In accordance with a further aspect, the mandrel comprises a cylindrical surface and an end surface, the first portion of multimode optical fiber being wrapped about the cylindrical surface, and the adjustable loop being disposed adjacent the end surface.

In this case, the adjustable loop is protected by the adjacent surface thereby minimizing the risk that the adjustable loop of optical fiber might be inadvertently displaced or pinched by other components surrounding the apparatus in the test instruments within which it is integrated for example. Such displacement or pinching may result in an unacceptable disturbance of the modal distribution.

In accordance with another aspect of the invention, there is provided a method for adjusting the modal distribution of light propagating in a multimode optical fiber. The method comprises wrapping a first portion of multimode optical fiber about a circular mandrel having a diameter adapted for inducing preferential attenuation of high-order optical fiber modes of said light in said first portion of multimode optical fiber; and adjusting a loop of a second portion of multimode optical fiber optically coupled to said first portion, for adjusting the modal distribution of said light.

In accordance with yet another aspect of the invention, there is provided a device to be used in adjusting the modal distribution of light propagating in a multimode optical fiber. The device comprises a circular mandrel adapted for wrapping a first portion of said multimode optical fiber thereabout, having a diameter adapted for inducing preferential attenuation of high-order optical fiber modes of light in the multimode optical fiber; and at least a first fiber positioning feature on said mandrel for receiving one end of an adjustable loop of a second portion of said multimode optical fiber and determining an orientation of the optical fiber at said one end, said first positioning feature allowing said one end of said loop to be slid therein in order to adjust said loop.

BRIEF DESCRIPTION OF THE DRAWINGS

Further features and exemplary advantages of the present invention will become apparent to the skilled person from the following detailed description, taken in conjunction with the appended drawings, in which.

It will be noted that throughout the appended drawings, like features are identified by like reference numerals.

DETAILED DESCRIPTION

Figure 1:
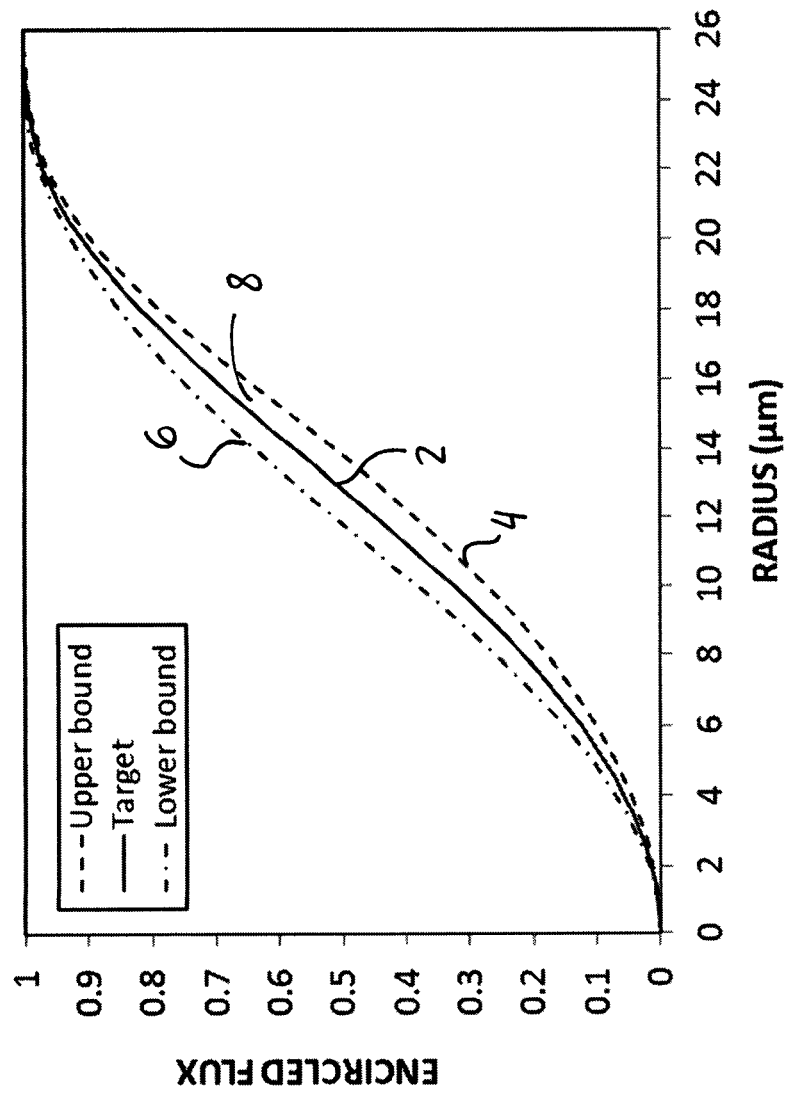
FIG. 1 (prior art) is a graph showing the target function for the encircled flux defining launch conditions requirements as per IEC 61280-4-1 international Standard, at a wavelength of 850 nm and for a 50-µm multimode optical fiber.

Now referring to the drawings, FIG. 1 is a graph illustrating the encircled flux target function 2 defining launch conditions requirements as per IEC 61280-4-1 international Standard, at a wavelength of 850 nm and for a multimode optical fiber having a 50-µm core diameter. The lower and upper boundaries 4, 6 defining the acceptable deviations 8 from the defined target are also illustrated.

However, for a given type of multimode optical fiber, the actual encircled flux requirements are defined for each of four predefined radial values in the fiber core and for each of two wavelengths, i.e. 850 and 1300 nm. The following tables list those requirements defined by the IEC 61280-4-1 Standard for a 50-µm core optical fiber of category A1a as defined in the IEC 60793-2-10 Standard.

TABLE 1

EF requirements for a 50-µm core optical fiber at 850 nm.

| Radius (µm) | EF lower bound | Target | EF upper bound |
|---|---|---|---|
| 10 | 0.2785 | 0.3350 | 0.3915 |
| 15 | 0.5980 | 0.6550 | 0.7119 |
| 20 | 0.9105 | 0.9193 | 0.9295 |
| 22 | 0.9690 | 0.9751 | 0.9812 |

TABLE 2

EF requirements for a 50-μm core optical fiber at 1300 nm.

| Radius (μm) | EF lower bound | Target | EF upper bound |
|---|---|---|---|
| 10 | 0.270 | 0.3366 | 0.3940 |
| 15 | 0.5996 | 0.6567 | 0.7138 |
| 20 | 0.9072 | 0.9186 | 0.9300 |
| 22 | 0.9663 | 0.9728 | 0.9793 |

It is noted that even though the embodiments described herein are exemplified for the specific case of (widely-deployed) gradient-index multimode optical fibers having a 50-μm core diameter (IEC 60793-2-10 category A1a), it should be understood that these embodiments could be easily adapted for use with other types of multimode optical fibers such as 62.5-μm-core optical fibers or others.

Figure 2:
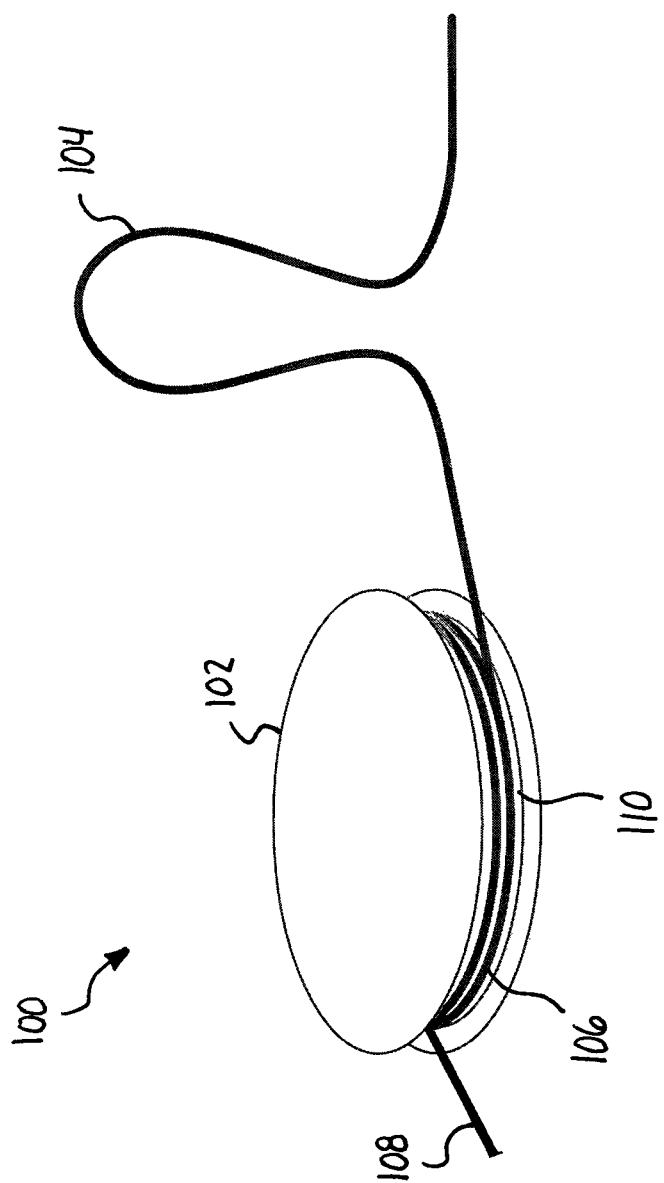
FIG. 2 is a schematic illustrating an apparatus for adjusting the modal distribution of light in a multimode optical fiber.

FIG. 2 shows an apparatus 100 which may be employed to adjust the launch conditions to comply with the EF requirements defined by an International Standard. The apparatus 100 comprises the combination of a mandrel wrapping 102 of a predetermined number of turns of the multimode optical fiber in which the modal distribution is to be adjusted, and an adjustable loop 104 of this same fiber.

When light is coupled to a multimode launch optical fiber, depending on various factors, the coupling may result in the multimode launch optical fiber being underfilled or overfilled. However, the apparatus 100 described herein below is to be employed for conditioning light that is initially overfilled (with respect to the target encircled flux function). It should however be understood that if the initial condition is underfilled, a mode scrambler, e.g. implemented as a bent or otherwise stressed step-index multimode fiber, may be added upstream in order to provide overfilled conditions at the input of the apparatus 100. Of course, the mode-scrambler could also be included within the apparatus 100. The same applies to the other embodiments described herein.

In the apparatus 100, a first portion 106 of the multimode optical fiber 108, which is typically a graded-index optical fiber, is wrapped about a circular mandrel 110. The diameter of the mandrel and the number of turns about the mandrel are chosen such that it induces a pre-filtering that roughly adjusts the encircled flux function close to the requirements defined by the Standard. For a given type of multimode optical fiber, the exact core diameter and numerical aperture of the actual fiber may vary from one fiber spool to another and even along the fiber within the same spool, within tolerances provided by the optical fiber manufacturer. Accordingly, the mandrel diameter and the number of turns, which are typically fixed for a given apparatus 100, should be selected to provide, after the mandrel wrapping 102, an overfilled or Standard compliant condition (at least not underfilled), for all the multimode optical fibers within the fiber manufacturer tolerances, or more restricted tolerances defined by the apparatus manufacturer if necessary. In the case of 50-μm-core/125-μm-cladding multimode optical fibers, it was found that one or two turns about a mandrel having a diameter of 30 mm is an appropriate choice, but other configurations could be used as well.

The adjustable loop 104 is made of a second portion of the same multimode optical fiber 108. The loop 104 is generally adjustable by varying the length of the portion of optical fiber that is looped, thereby changing the radius of the curvature induced to the optical fiber in the loop 104. The loop 104 provides additional mode filtering, and adjusting the curvature of the looped portion of optical fiber allows the optical fiber mode filtering to be fine-tuned such that the encircled flux function measured at the output of the apparatus complies with requirements such as those defined by international Standards. When the encircled flux requirements are met, the adjustable loop may be secured in place such that launch conditions become fixed and remain stable in time.

It should be understood that the direction of light propagating in the multimode optical fiber 108 of the apparatus 100 does not matter. Light may propagate from the mandrel wrapping 102 to the adjustable fiber loop 104, or vice versa. Apparatus 100 may therefore be used in one direction or the other, and this also applies to the other embodiments described hereinbelow.

FIG. 2 shows a mandrel wrapping 102 and an adjustable loop 104 that are completely apart in space. It may however be advantageous for space-efficiency reasons or for any other reasons to have both implemented within a single mechanical device. The two embodiments described hereinbelow illustrate such implementations.

Figure 3:
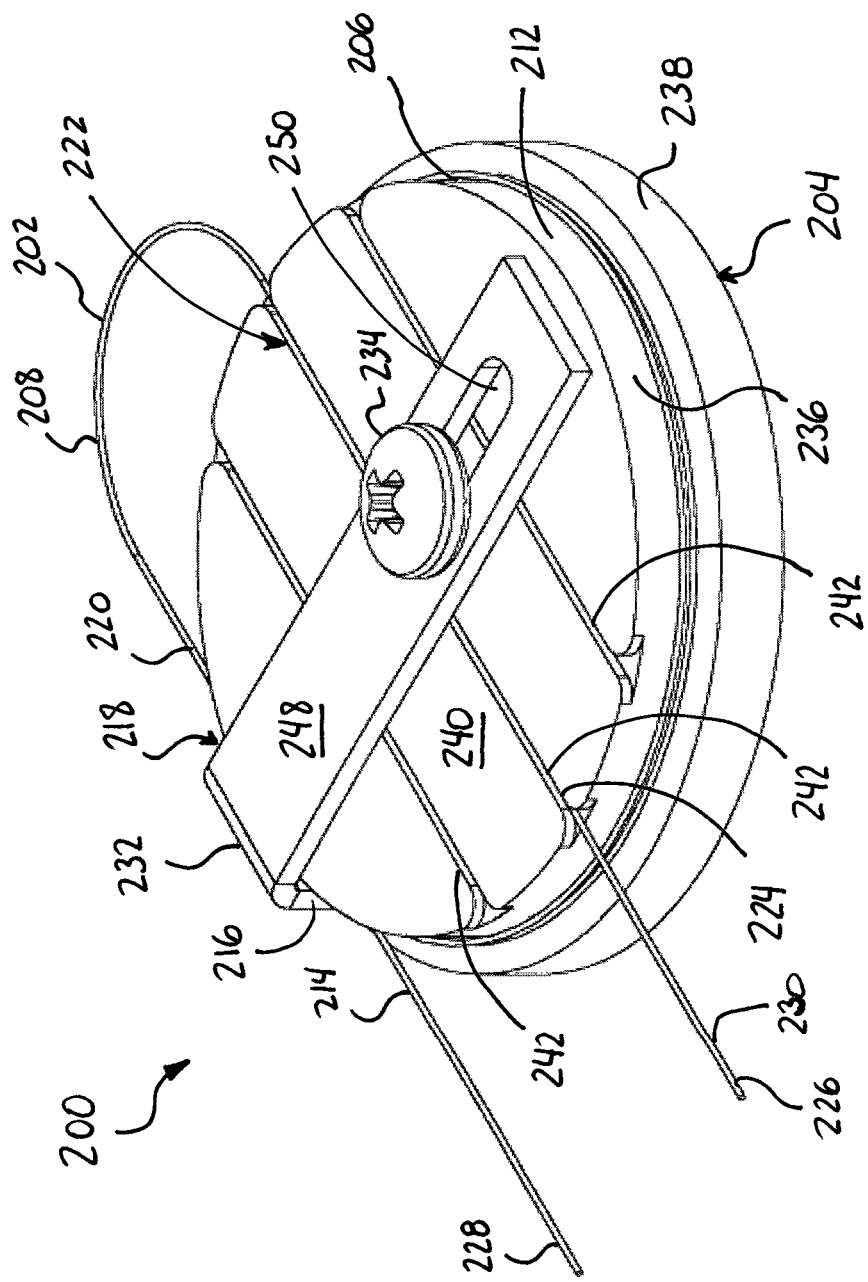
FIGS. 3, 4 and 5 are respectively a front top isometric view, a back top isometric view and a top view of an apparatus for adjusting the modal distribution of light in a multimode optical fiber, in accordance with one embodiment wherein the optical fiber is looped outside of the mandrel.
Figure 4:
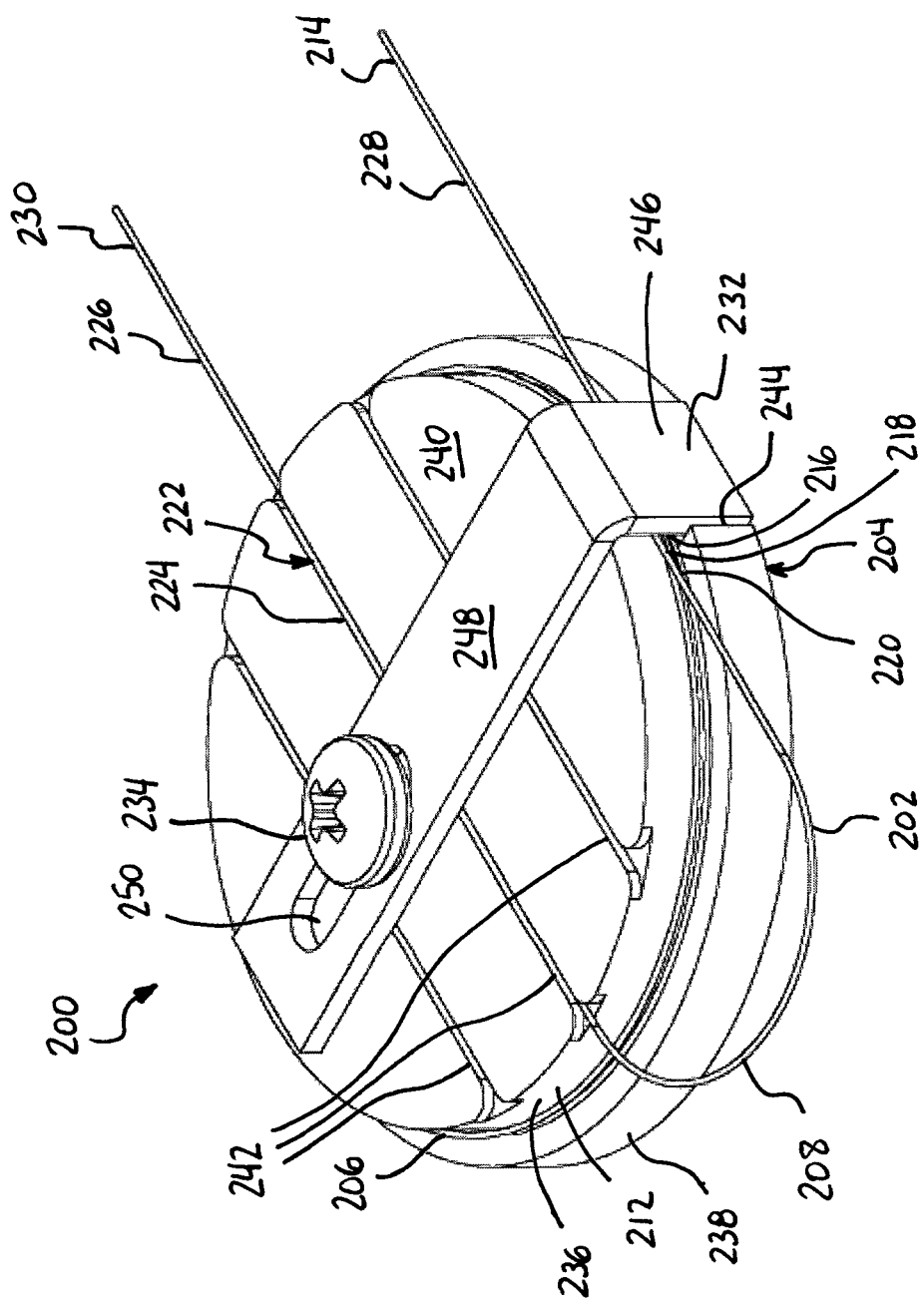
Figure 5:
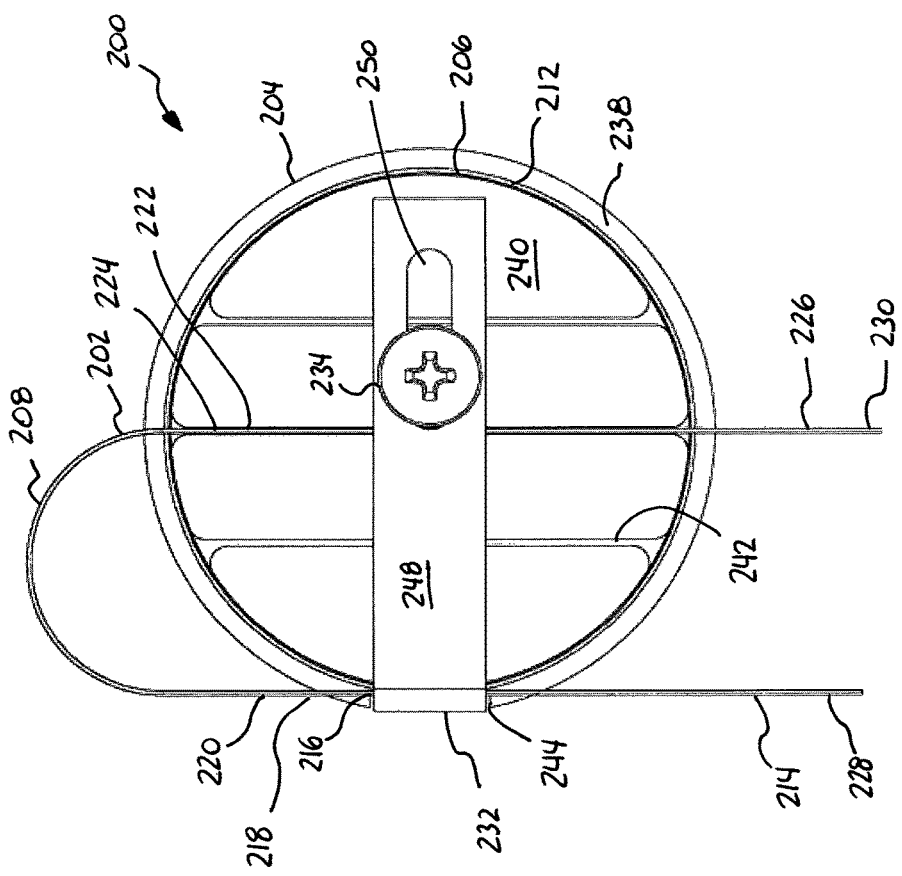

FIGS. 3, 4 and 5 shows one embodiment of the apparatus of FIG. 2, for adjusting the modal distribution of light in a multimode optical fiber 202. The apparatus 200 comprises a mandrel device 204 about which a first portion 206 of the optical fiber 202 is wrapped, and an adjustable loop 208 of a second portion of the optical fiber 202, which runs outside the mandrel device 204 and returns to a top surface 210 thereof, from where it is guided out of the apparatus 200.

The mandrel device 204 comprises a circular mandrel 212 and a series of positioning features used to guide the optical fiber on the mandrel device 204 in order to form the mandrel wrapping 206 and the adjustable loop 208. The first end 214 of the optical fiber 202 coincides with the first end of the mandrel wrapping 206. Its position and orientation on the mandrel device 204 is established by a first positioning feature 216. The first portion 206 of optical fiber is then wrapped about the mandrel 212 with a given number or turns before it returns to this same positioning feature 216, which sets the position and orientation of the second end 218 of the mandrel wrapping 206. In this embodiment, the number of turns being integral, the same positioning feature 216 is used for both ends of the mandrel wrapping. However, should the number of turns not be integral for example, separate positioning features could be used.

The second portion of optical fiber, which forms the adjustable loop 208, has a fixed end 220 coinciding with the second end 218 of the mandrel wrapping 202, and an adjustable end 222 that is initially free to move in a second positioning feature 224. The length of loop 208 is adjustable by sliding the adjustable end 222 within the positioning feature 224. In fact, the mandrel device comprises a plurality of positioning features 224 that may be used to position the adjustable end 222 of the loop. Of course, after adjustment, this adjustable end 222 is fixed so that the modal distribution remains fixed and stable. Positioning feature 224 determines the orientation of the optical fiber at end 222, which coincides with the second end 226 of the multimode optical fiber 202. In this embodiment, between the positioning features 216 and 224, the optical fiber undergoes a 180° turn. Of course, this angle could differ in other embodiments.

It should be appreciated that the orientation of the first end 214 of the multimode optical fiber, i.e. the input optical fiber 228, as well at the orientation of the second end 226 of the multimode optical fiber, i.e. the output optical fiber 230, are independent of the length of the adjustable loop 208. This allows adjustment of the modal distribution with fixed orientations of the input and output optical fibers 228, 230 of the apparatus 200.

In this embodiment, the mandrel device 204 is made of the circular mandrel 212 and an L-shaped bracket 232, which are to be assembled together using a screw 234 that vertically affixes one to the other. The mandrel 212 has a cylindrical surface 236 about which the first portion of optical fiber 206 is wrapped, a rim 238 on the bottom end of the cylinder and a top surface 240. The rim 238 is used to facilitate straight wrapping of the optical fiber about the mandrel 212. The top surface 240, which is in this case perpendicular to the axis of the cylindrical surface 236, has three mutually-spaced grooves 242 engraved therein into which the adjustable end 222 of the loop is to be inserted and which constitute the plurality of positioning features 224. In order to provide increased adjustment range, the adjustable end 222 of the loop may be inserted in either one of the grooves 242. Accordingly, adjustment of the loop 208 is provided by selecting one of the grooves 242 in which to insert the adjustable end 208 of the loop and then sliding the adjustable end 208 within the selected groove. The selection of the groove 242 and the adjustment of the loop are made empirically by measuring the encircled flux at the output of the multimode optical fiber 202. If the groove 242 into which the adjustable end 208 is initially inserted does not provide the desired adjustment, adjustable end 208 is inserted in another groove 242 until the proper adjustment is reached. Of course, the number of grooves and their position on the top surface 240 could vary.

The mandrel 212 also has a recess 244 in the rim 238 to receive one end of the bracket 232. The L-shaped bracket 232 has a short end 246 and a long end 248 perpendicular to one another, and a hole 250 through the long end 248 in order to affix the bracket 232 on the top surface 240 of the mandrel using the screw 234. When assembled, the short end 246 rests within the recess 244 and against the wrapped first portion 206 of optical fiber. The short end 246 and the mandrel 212 together define a channel therebetween which constitutes positioning feature 216 and which determines the beginning and the end of the mandrel wrapping 206. When assembled, the long end 248 of the bracket 232 extends on the top surface 240 and over the grooves 242 to help in maintaining the adjustable end 222 into the groove while making the adjustment, i.e. in the manufacturing process.

The adjustment is typically made by monitoring the modal distribution while adjusting the adjustable loop 208. When the adjustment is deemed satisfactory, e.g. meeting the requirements for encircled flux as defined by the appropriate Standard, the adjustable end 222 of the loop may be fixed in place using a drop of epoxy glue or a UV light cure adhesive, for example. The position of other portions of the optical fiber 202 may also be affixed using an adhesive or any other suitable means if needed.

Figure 6:
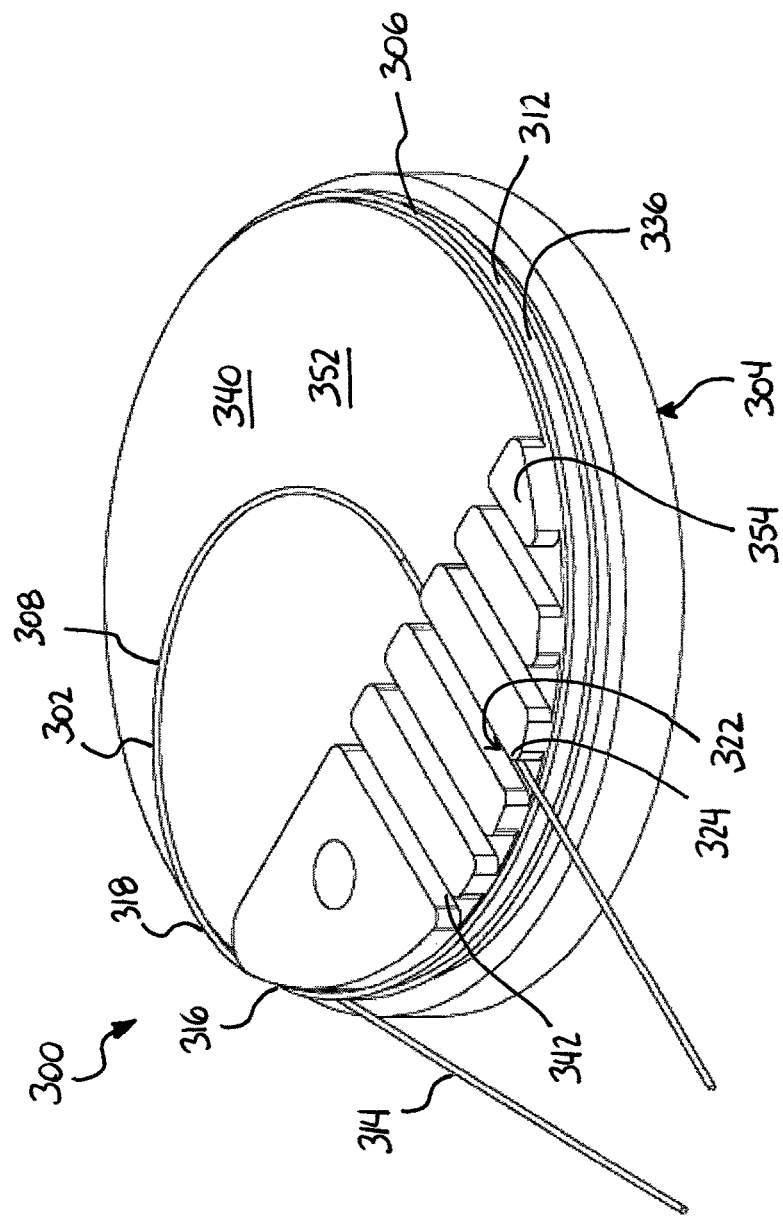
FIGS. 6, 7 and 8 are respectively a front top isometric view, a back top isometric view and a top view of an apparatus for adjusting the modal distribution of light in a multimode optical fiber, in accordance with another embodiment wherein the optical fiber is looped on a top surface of the mandrel.
Figure 7:
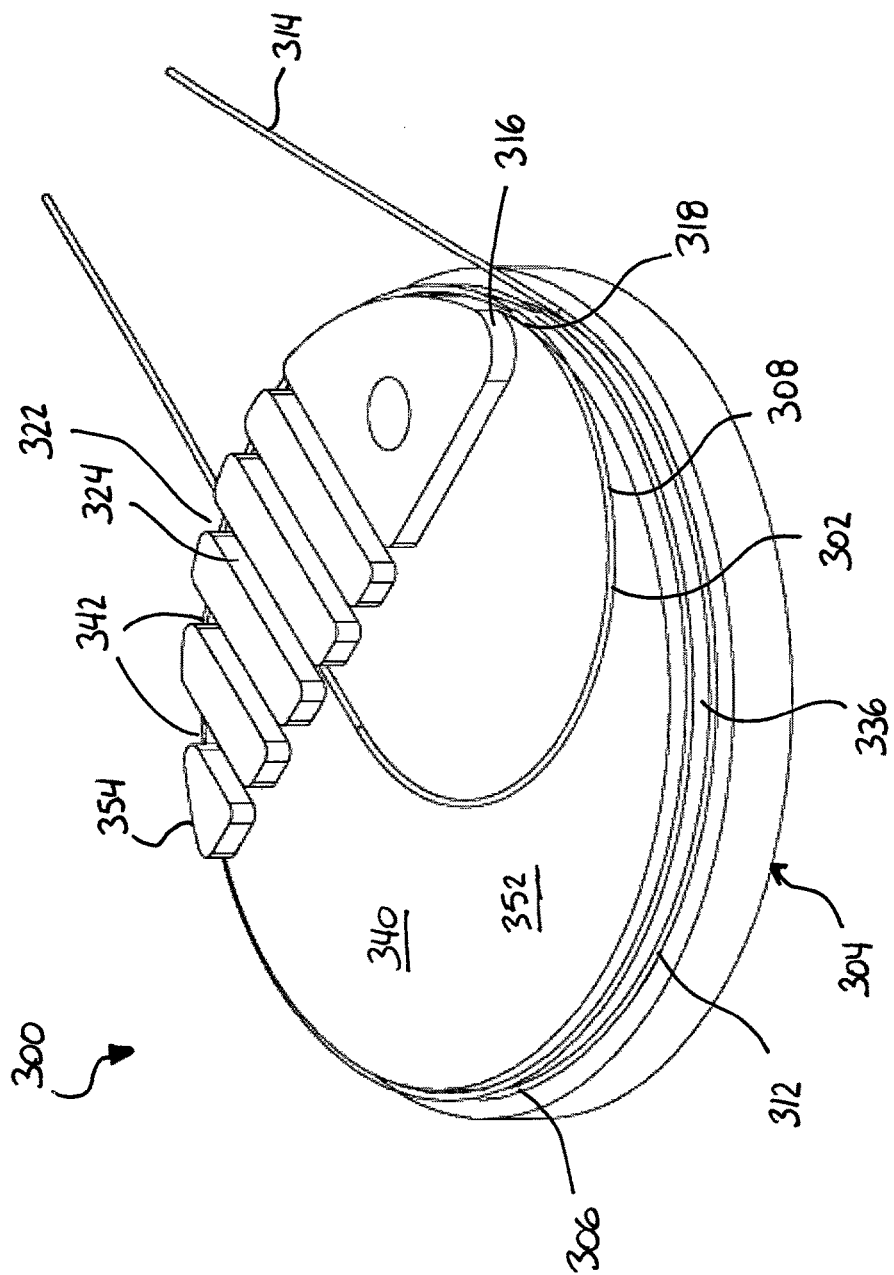
Figure 8:
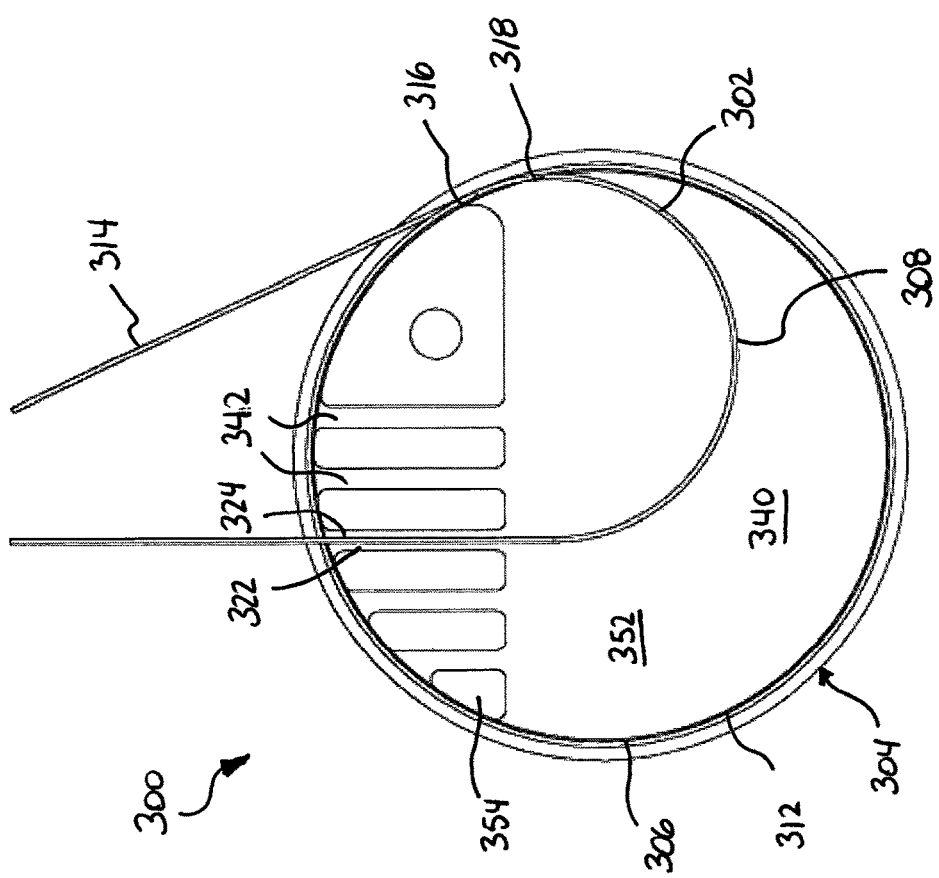

FIGS. 6, 7 and 8 show another embodiment of an apparatus 300 for adjusting the modal distribution of light in a multimode optical fiber 202. The apparatus 300 is similar to apparatus 200 of FIGS. 3, 4, 5, but for the disposition of the adjustable loop 208 of optical fiber and the positioning features. Similar parts and features will therefore not be repeatedly described. In the apparatus 300 of FIGS. 6, 7 and 8, the adjustable loop 208 of optical fiber 202 is disposed adjacent the top surface 340 such that it lies thereon. The top surface 340 somewhat protects the adjustable loop 208 to reduce the risk that it might be inadvertently displaced or pinched by other components surrounding the apparatus 300, for example.

As with apparatus 200, apparatus 300 comprises a mandrel device 304 about which a first portion 306 of the optical fiber 302 is wrapped, and an adjustable loop 308 of a second portion of the optical fiber 302. However, in apparatus 300, the adjustable loop 308 lies on the top surface 304 of the apparatus 300. The mandrel device 304 comprises a circular mandrel 312 and a series of positioning features used to guide the optical fiber onto the mandrel device 304 in order to form the adjustable loop 308.

In the apparatus 300, there is no specific positioning feature on the mandrel device 304 that determines the position of the first end 314 of the mandrel wrapping 306. In this case, this first end 314 is meant to be fixed using an adhesive such as a drop of epoxy glue or UV light cure adhesive.

The top surface 340 of the mandrel device 304 (which is perpendicular to the axis of the cylindrical surface 336 forming the mandrel 312) comprises a flat portion 352 on which the adjustable loop 308 is disposed and a plurality of protrusions 354, forming positioning features. A first positioning feature 316 determines the position of the second end 318 of the mandrel wrapping 306 and the beginning of the loop 308. A set of second positioning features 324 are meant to receive the adjustable end 322 of the loop 308. The positioning features 324 are formed by grooves 342 defined between protrusions 354 and into which the adjustable end 322 of the loop may be inserted. Similarly to apparatus 200, the protrusions 354 form a plurality of mutually-spaced positioning features 324 (five, in this case). In order to provide increased adjustment range, the adjustable end 322 of the loop may be inserted into either one of the positioning features 324. Accordingly, adjustment of the loop 308 is provided by first inserting the adjustable end 308 of the loop into one of the positioning features 324 and then sliding the adjustable end 308 within the selected positioning features 324. If the selected positioning feature 324 does not provide the desired adjustment, the adjustable end 322 may be moved to another positioning feature 324 and slid again until the proper adjustment is obtained.

Once the adjustment is deemed satisfactory, e.g. meeting the requirements of encircled flux, the adjustable end 322 of the loop may be fixed in place using a drop of glue or UV light cure adhesive, for example. The position of other portions of the optical fiber 302 may also be affixed using adhesive or any other suitable means if needed.

Figure 9:
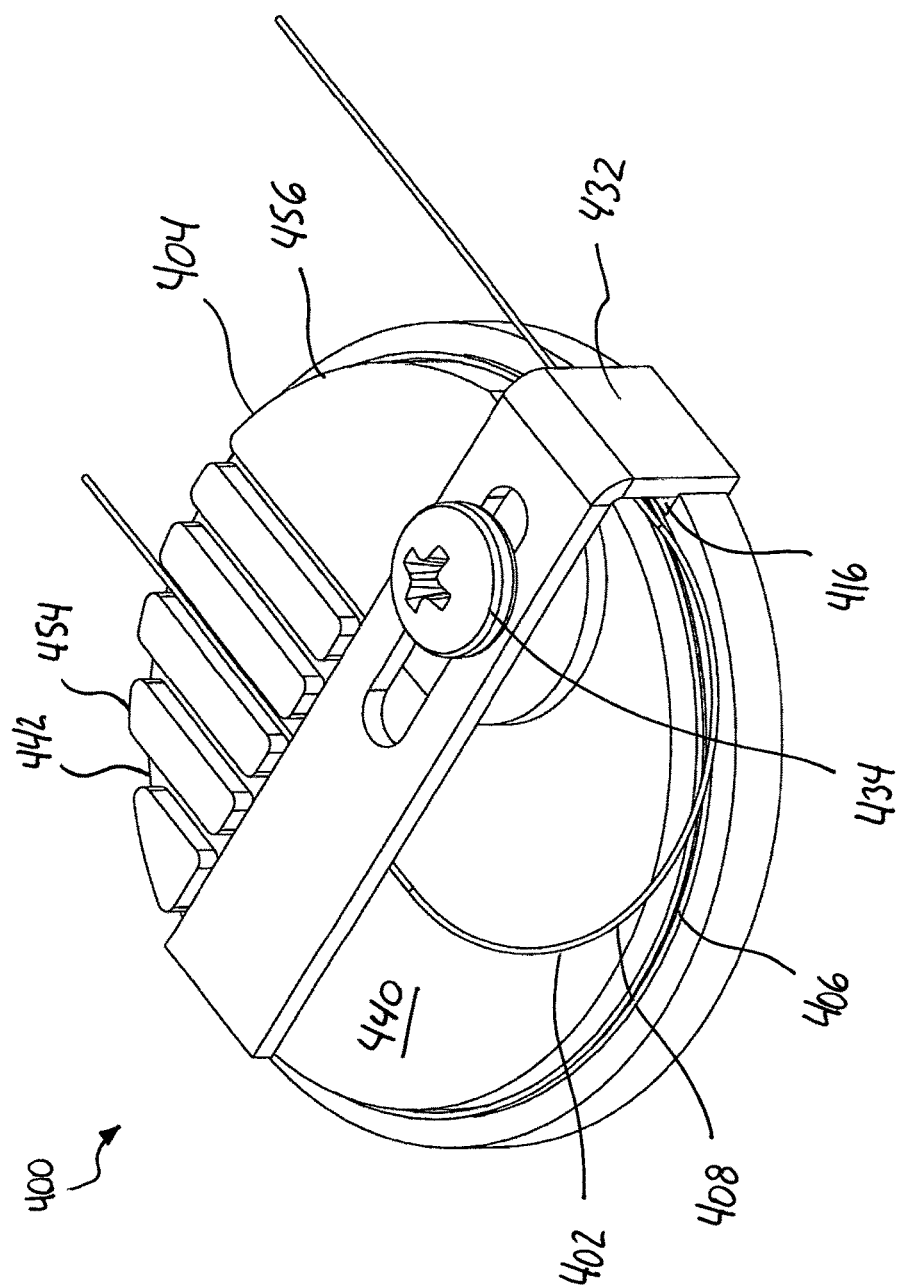
FIG. 9 is back top isometric view of an apparatus for adjusting the modal distribution of light in a multimode optical fiber, in accordance with yet another embodiment wherein the optical fiber is looped on a top surface of the mandrel and a bracket is employed to help hold the fiber during manufacturing of the said apparatus.
Figure 10:
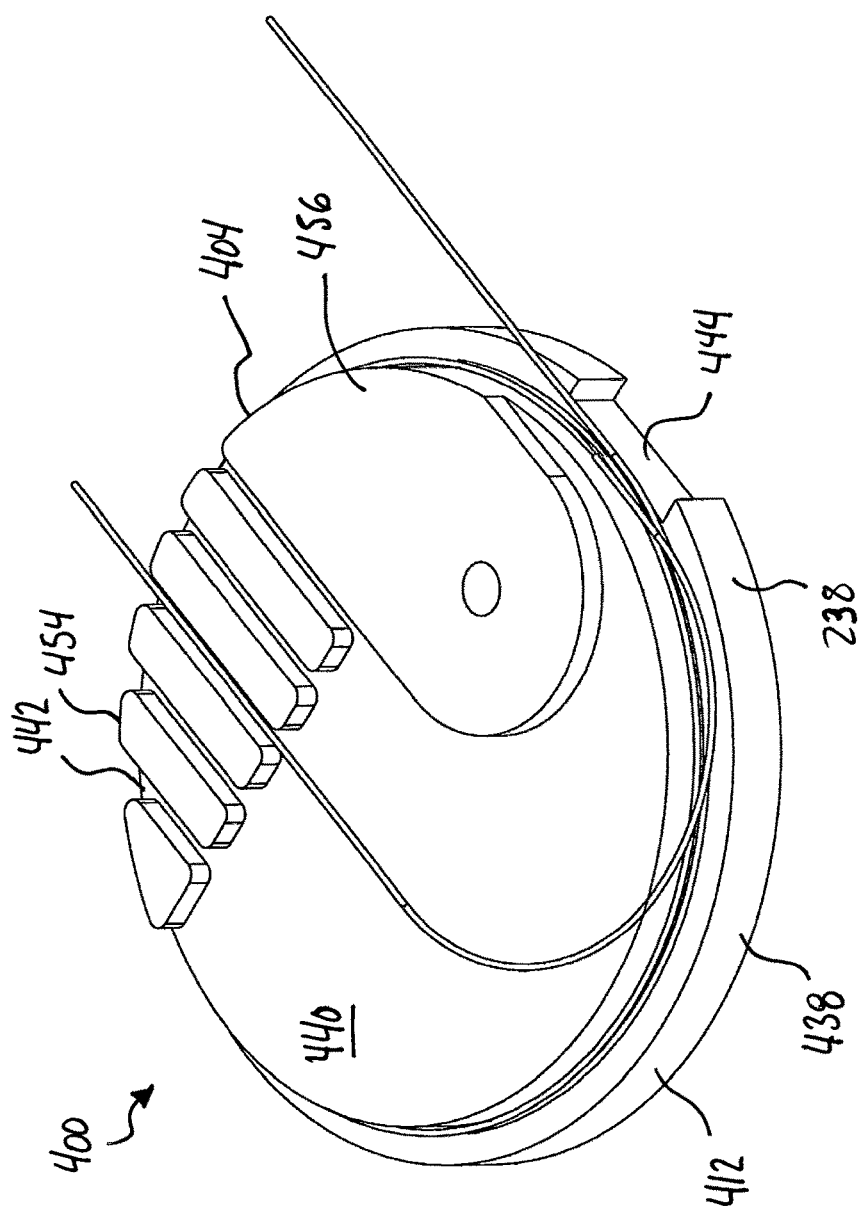
FIG. 10 is back top isometric view of the apparatus of FIG. 9, wherein the bracket is removed.

FIGS. 9 and 10 show yet another embodiment of an apparatus 400 for adjusting the modal distribution of light in a multimode optical fiber 402. The apparatus 400 is similar to apparatus 300 of FIGS. 6, 7 and 8, but includes an L-shape bracket 432 that is assembled with the mandrel device 404, as in the apparatus 200 of FIGS. 3, 4 and 5. The apparatus 400 can be regarded as a hybrid embodiment comprising elements of apparatuses 200 and 300 and, hence, similar parts and features will not be repeatedly described.

As apparatuses 200 and 300, apparatus 400 comprises a circular mandrel 404 about which a first portion 406 of the optical fiber 402 is wrapped, and an adjustable loop 408 of a second portion of the optical fiber 402. As in apparatus 300, apparatus 400 has an adjustable loop 408 of optical fiber 402 that is disposed adjacent its top surface 440 such that it mostly lies thereon. However, apparatus 400 further comprises an L-shaped bracket 432 in order to help hold the optical fiber 402 in place during encircled flux adjustment. Accordingly, the mandrel 412 also has a recess 444 in its rim 438 (see FIG. 10) to receive one end of the bracket 432. As in apparatus 200, the bracket 432 and the mandrel 412 together define a channel therebetween which constitutes a positioning feature 416 and which determines the beginning and the end of the mandrel wrapping 406. The top surface 440 of the mandrel device 404 comprises a plurality of protrusions 454 with grooves 442 defined therebetween forming positioning features. In order to affix the bracket 432 on the mandrel device 404, one of the protrusions 456 extends on the top surface 440 beyond the grooves 442 defined by the other protrusions 454. A screw 434 is used to affix the bracket 432 to the mandrel device 404.

It is a noted that, even though the embodiments described herein include only one adjustable loop of optical fiber, the optical fiber could also form additional loops (adjustable or not) in the apparatus. For instance, there could be a plurality of independently adjustable loops.

It is also noted that, even though the embodiments described herein employ a mandrel wrapping for which the fixed number of turns is an integer, it should be understood that a non-integral number of turns may be used just as well.

It should also be understood that having a number of turns of mandrel wrapping that is predetermined for a given embodiment is advantageous from a manufacturing perspective, for fiber management issues. However, if additional adjustment of the modal distribution is needed for example, the number of turns may also be varied when mounting the optical fiber on the mandrel device.

For the embodiments described herein, the mandrel wrapping and the adjustable loop are made of continuous lengths of the same optical fiber cable in order to facilitate compact packaging and simplify the manufacturing process. It is however noted that, in other embodiments, the first portion of optical fiber, which is mandrel wrapped, and the second portion of optical fiber, which forms the loop, could be different optical fibers with suitable coupling means therebetween, such as a fusion splice or a fiber-optic connector. One or more optical components could also be inserted between the first and the second portion of optical fiber should this be necessary to perform any other function.

Figure 11:
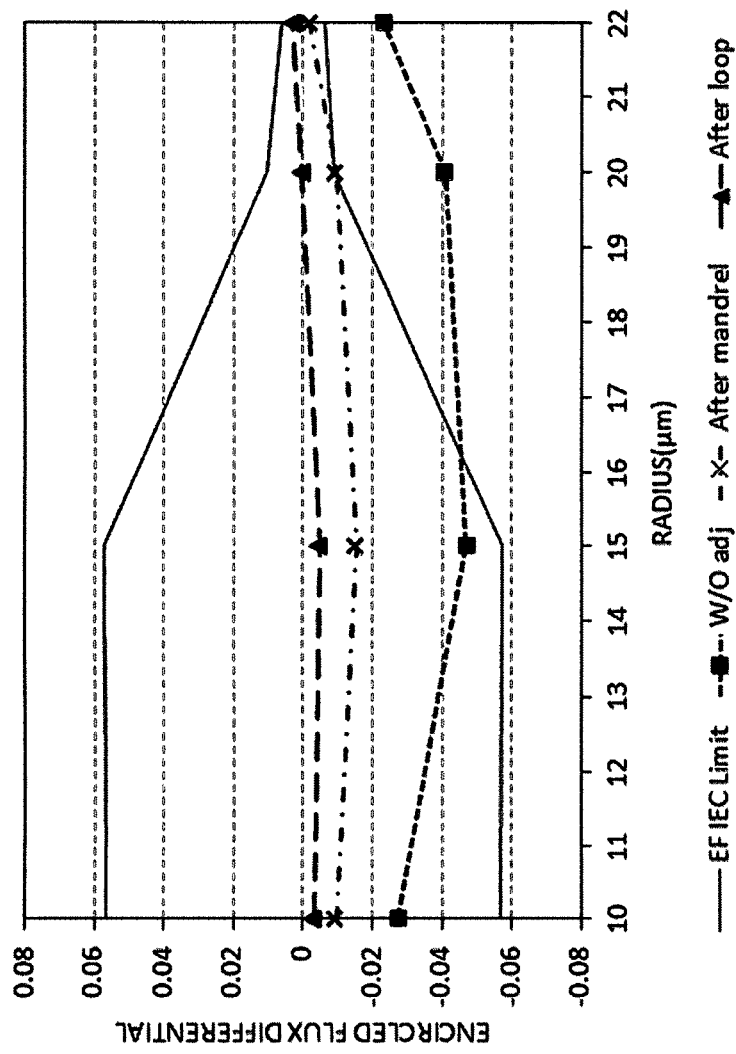
FIG. 11 is a graph showing exemplary measurement results of encircled flux deviations relative to the target encircled flux values as defined by the IEC 61280-4-1 Standard at a wavelength of light of 850 nm exiting the apparatus of FIGS. 3, 4 and 5; the solid-square trace showing measurements obtained on light exiting a fiber-optic cable, without any modal distribution adjustment; the "X" trace showing measurements obtained after a first portion of the optical fiber cable is wrapped about the mandrel; and the solid-triangle trace showing measurements obtained after adjusting the loop.
Figure 12:
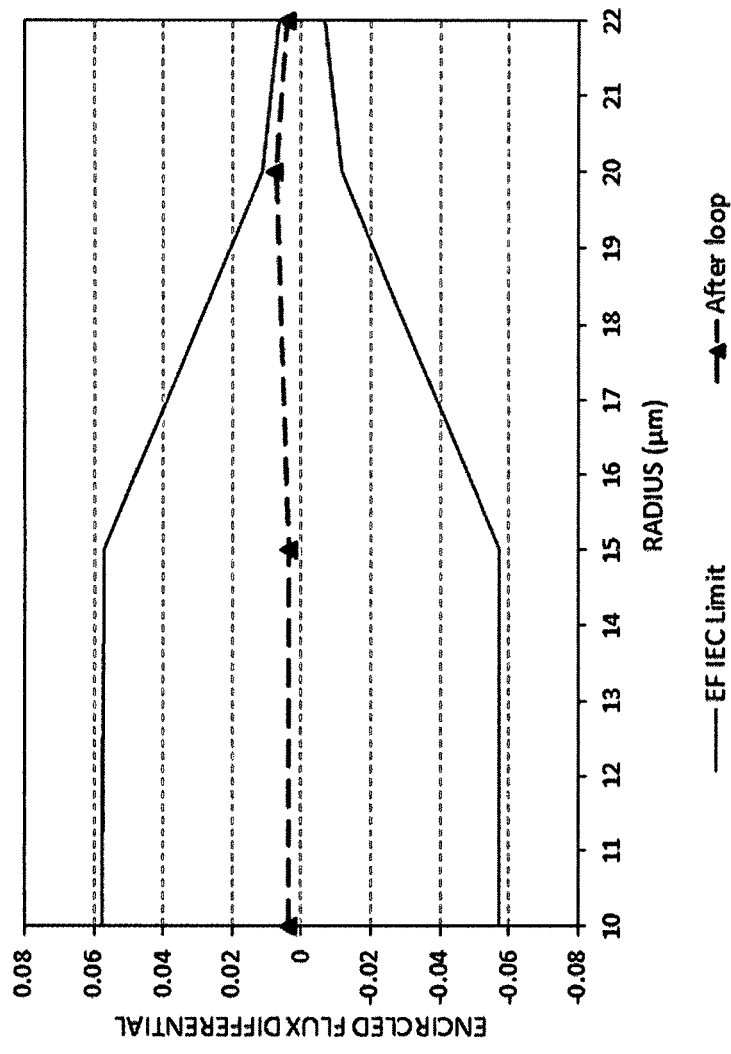
FIG. 12 is a graph showing exemplary measurement results of encircled flux deviations relative to the target encircled flux values as defined by the IEC 61280-4-1 Standard at a wavelength of light of 1300 nm exiting the apparatus of FIGS. 3, 4 and 5.

FIGS. 11 and 12 are graphs showing example results obtained when adjusting the modal distribution in a launch optical fiber using the apparatus 200 of FIGS. 3, 4 and 5. These graphs also illustrate the method used to perform the adjustment. In the specific case of these measurements, the mandrel has a diameter of 30 mm and the optical fiber is turned once about the mandrel. The optical fiber is a 50/125 optical fiber cable (50-μm-core/125-μm-cladding) of category A1a as defined in IEC 60793-2-10. The modal distribution in the optical fiber may be adjusted by monitoring the encircled flux function at a wavelength of 850 nm. The encircled flux function obtained in this manner at a wavelength of 1300 nm is subsequently measured without moving or readjusting the adjustable loop.

The graphs of FIGS. 11 and 12 shows encircled flux measurements. The EF deviation relative to the target values of the encircled flux function is plotted for radii of 10, 15, 20 and 22 μm, as defined by the IEC 61280-4-1 Standard for a 50-μm-core optical fiber (see Table 1 for target values at 850 nm and Table 2 for target values at 1300 nm).

The graph of FIG. 11 shows the encircled flux measurement performed at a wavelength of light of 850 nm. The measurements are performed using a surface-emitting diode with a central wavelength at about 850 nm, the light from which is coupled into the optical fiber of the apparatus 200 (see FIGS. 3 4, 5), and a commercially-available encircled flux meter (Arden Photonics Ltd. Model MPX-1 encircled flux meter) to measure the encircled flux function at the output of the apparatus. FIG. 11 includes three traces, as well as the Encircled Flux lower and upper boundaries (in solid lines) defined by the Standard at this wavelength. The solid-square trace shows the encircled flux measurements obtained on light exiting the optical fiber cable without any modal distribution adjustment, i.e. before it is wrapped or looped. It can be seen that the modal distribution is then overfilled. A first portion of the optical fiber cable is then wrapped about the mandrel. In this case, a single turn is made. The "X" trace shows the encircled flux measurements obtained on light exiting the optical fiber cable after the mandrel wrapping. It can be seen that, in this example, the modal distribution is filtered but is not yet within the requirements defined by the Standard. In fact, in this example, the requirements are met at 10, 15 and 22 μm and the encircled flux value at 20 μm is slightly outside of the limit. A loop is then formed on a second portion of the optical fiber cable by inserting one end of it in a positioning feature. The loop is then adjusted to fine tune the modal distribution while monitoring the encircled-flux function at the encircled-flux meter, on light exiting the optical fiber cable. As explained hereinabove, in the course of adjusting the loop, the optical fiber may be moved from one positioning feature to another until the proper adjustment is found. The solid-triangle trace shows the encircled flux measurements obtained after the loop is adjusted. It can be seen that the values of encircled flux are indeed within the boundaries defined by the Standard.

Compliance with the requirements defined by the appropriate Standard at the 1300-nm wavelength should also be verified. The graph of FIG. 12 shows the encircled flux measurements performed at 1300 nm on the adjusted device (solid-triangle trace). In this case, the measurements are performed using a 1300-nm surface emitting diode and an experimental test set-up developed for performing encircled flux measurements. Of course, commercially-available instruments could be used as well. FIG. 12 also shows the Encircled Flux lower and upper boundaries (in solid lines) defined by the Standard at this wavelength. The measurements confirm that the modal distribution obtained with this apparatus also meets the requirements at 1300 nm.

It should be noted that, in some applications, the target encircled flux values and boundaries of light being conditioned by the mandrel wrapping and the adjustable loop may not actually directly correspond to the applicable Standard. For example, intermediate target encircled flux values could be defined which would be slightly offset from the actual Standard in order to take into account some other components or optical fiber splices that are known to affect the modal distribution of light and which are to be disposed in the optical fiber path "downstream from" the mandrel wrapping and the adjustable loop but before light is actually launched into any optical fiber link under test.

It should be understood that even though reference is made herein to the Encircled Flux requirements as defined by the IEC 61280-4-1 Standard, the embodiments described herein may be used equally to adjust the modal distribution in accordance with other definitions and other requirements. For instance, the modal distribution could equally be characterized in terms of 85/85 or 90/90 launch conditions (see AECMA Standard EN 2591-100 for example) or in terms of the Mode-Power Distribution (MPD) template and Coupled Power Ratio (CPR) (as defined in ISO/IEC 14763-3 for example).

The embodiments described above are intended to be exemplary only. The scope of the invention is therefore intended to be limited solely by the appended claims.

What is claimed is:

1. An apparatus for adjusting the modal distribution of light propagating in a multimode optical fiber, the apparatus comprising:

a first portion of multimode optical fiber wrapped about a mandrel having a first radius of curvature adapted for inducing preferential attenuation of high-order optical fiber modes of said light in said first portion of multimode optical fiber, wherein the mandrel has a shape that is non-adjustable;

an adjustable loop of a second portion of multimode optical fiber optically coupled to said first portion, said adjustable loop having a curvature being adjusted to a second radius of curvature being smaller than said first radius of curvature of said mandrel, for adjusting the modal distribution of said light propagated in the multimode optical fiber; and a first fiber positioning feature for receiving an adjustable end of said adjustable loop of multimode optical fiber, said first fiber positioning feature determining an orientation of said multimode optical fiber at said adjustable end, said loop being adjustable by sliding the adjustable end within the first fiber positioning feature.

2. The apparatus as claimed in claim 1, wherein said mandrel comprises a cylindrical surface and an end surface, said first portion of multimode optical fiber being wrapped about said cylindrical surface, and said first fiber positioning feature being disposed on said end surface of said mandrel.

3. The apparatus as claimed in claim 2, further comprising a second fiber positioning feature determining an orientation of the other end of said adjustable loop.

4. The apparatus as claimed in claim 1, wherein said apparatus comprises a plurality of first fiber positioning features into which the adjustable end may be inserted, wherein said curvature of said adjustable loop is also adjustable by selecting one of said first positioning features into which to insert the adjustable end.

5. The apparatus as claimed in claim 2, wherein the first fiber positioning feature comprises a groove on said end surface.

6. The apparatus as claimed in claim 1, wherein said adjustable loop is fixable after adjustment by affixing at least the adjustable end in place.

7. The apparatus as claimed in claim 6, wherein said apparatus further comprises an adhesive at the adjustable end of said adjustable loop for fixing said adjustable loop after adjustment.

8. The apparatus as claimed in claim 1, wherein said light propagating in the multimode optical fiber traverses said first portion before traversing said adjustable loop.

9. The apparatus as claimed in claim 1, wherein said first portion and said second portion of said multimode optical fiber are continuous lengths of a same optical fiber.

10. A method for adjusting the modal distribution of light propagating in a multimode optical fiber, the method comprising:

wrapping a first portion of multimode optical fiber about a mandrel having a first radius of curvature adapted for inducing preferential attenuation of high-order optical fiber modes of said light in said first portion of multimode optical fiber, wherein the mandrel has a shape that is non-adjustable;

forming a loop of a second portion of multimode optical fiber optically coupled to said first portion; and adjusting a curvature of said loop of said second portion of multimode optical fiber to one of a plurality of second radiuses of curvature, the second radiuses of curvature being smaller than said first radius of curvature of said mandrel, for adjusting the modal distribution of said light propagated in the multimode optical fiber, said loop comprising a first end and being adjusted at least by sliding said first end within a first fiber positioning feature.

11. The method as claimed in claim 10, further comprising monitoring said modal distribution of light while adjusting said curvature of said loop.

12. The method as claimed in claim 11, further comprising fixing said loop after adjustment by affixing at least said first end within the fiber positioning feature.

13. The method as claimed in claim 10, wherein said curvature of said loop is adjusted such that said modal distribution complies with a modal distribution requirement defined by a target distribution and a predetermined tolerance.

14. The method as claimed in claim 13, further comprising measuring encircled-flux values, said target distribution being defined as target values of encircled-flux measurements.

15. The method as claimed in claim 10, wherein said curvature of said loop is further adjusted by inserting said first end into one of a plurality of positioning features.

16. A device to be used in adjusting the modal distribution of light propagating in a multimode optical fiber, the device comprising:

a mandrel adapted for wrapping a first portion of said multimode optical fiber thereabout, having a first radius of curvature adapted for inducing preferential attenuation of high-order optical fiber modes of light in the multimode optical fiber, wherein the mandrel has a shape that is non-adjustable; and at least a first fiber positioning feature on said mandrel for receiving one end of an adjustable loop of a second portion of said multimode optical fiber and determining an orientation of the multimode optical fiber at said one end, said first fiber positioning feature allowing said one end of said loop to be slid therein in order to adjust a curvature of said loop to a second radius of curvature being smaller than said first radius of curvature of said mandrel.

17. The device as claimed in claim 16, wherein said mandrel comprises a cylindrical surface, about which said first portion of multimode optical fiber is wrapped, and an end surface, said first fiber positioning feature protruding from said end surface along an axis of said cylindrical surface, and said end surface comprising a flat portion adjacent which said adjustable loop is to be disposed.

18. The device as claimed in claim 16, wherein said device comprises a second positioning feature on said mandrel for receiving the other end of said adjustable loop and for determining an orientation thereof.

19. The device as claimed in claim 16, wherein said device comprises a plurality of first fiber positioning features into which the one end may be inserted, wherein said curvature of said loop is also adjustable by selecting one of said first fiber positioning features into which to insert the one end.

20. The device as claimed in claim 16, wherein the positioning feature comprises a groove on said end surface.

* * * * *